United States Patent
Egedal et al.

(10) Patent No.: US 11,739,729 B2
(45) Date of Patent: Aug. 29, 2023

(54) SAFE STATE OF AN ADAPTABLE WIND TURBINE BLADE

(71) Applicant: Siemens Gamesa Renewable Energy A/S, Brande (DK)

(72) Inventors: Per Egedal, Herning (DK); Mikkel Aggersbjerg Kristensen, Herning (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 115 days.

(21) Appl. No.: 17/312,028

(22) PCT Filed: Nov. 4, 2019

(86) PCT No.: PCT/EP2019/080092
§ 371 (c)(1),
(2) Date: Jun. 9, 2021

(87) PCT Pub. No.: WO2020/120033
PCT Pub. Date: Jun. 18, 2020

(65) Prior Publication Data
US 2022/0025857 A1     Jan. 27, 2022

(30) Foreign Application Priority Data

Dec. 13, 2018  (EP) .................................. 18212377

(51) Int. Cl.
*F03D 7/02* (2006.01)
*F03D 1/06* (2006.01)

(52) U.S. Cl.
CPC ......... *F03D 7/0232* (2013.01); *F03D 1/0633* (2013.01); *F05B 2240/3052* (2020.08)

(58) Field of Classification Search
None
See application file for complete search history.

(56) References Cited

U.S. PATENT DOCUMENTS 5,106,265 A    4/1992   Holzem
8,616,846 B2 * 12/2013  Nanukuttan .......... F03D 1/0633
                                              416/231 A (Continued)

FOREIGN PATENT DOCUMENTS

EP    1 623 111 B1    9/2008
WO    2007/045940 A1  4/2007

(Continued)

OTHER PUBLICATIONS

European Search Report and Written Opinion of the European Searching Authority dated Jun. 26, 2019 for Application No. 18212377.8.

(Continued)

*Primary Examiner* — Kayla Mccaffrey
(74) *Attorney, Agent, or Firm* — Schmeiser, Olsen & Watts LLP

(57) ABSTRACT

Provided is an arrangement for controlling inflow and outflow of a fluid into and out of an expandable container arranged to change a state of an adaptable flow regulating device installed at a wind turbine rotor blade, the arrangement including: an inflow valve arranged to control fluid inflow into the container; an outflow valve arranged to control fluid outflow out of the container; wherein the inflow valve and the outflow valve are configured to prohibit fluid flow into and/or out of the container in case of safety stop event.

18 Claims, 2 Drawing Sheets

(56) References Cited

U.S. PATENT DOCUMENTS

Figure 1:
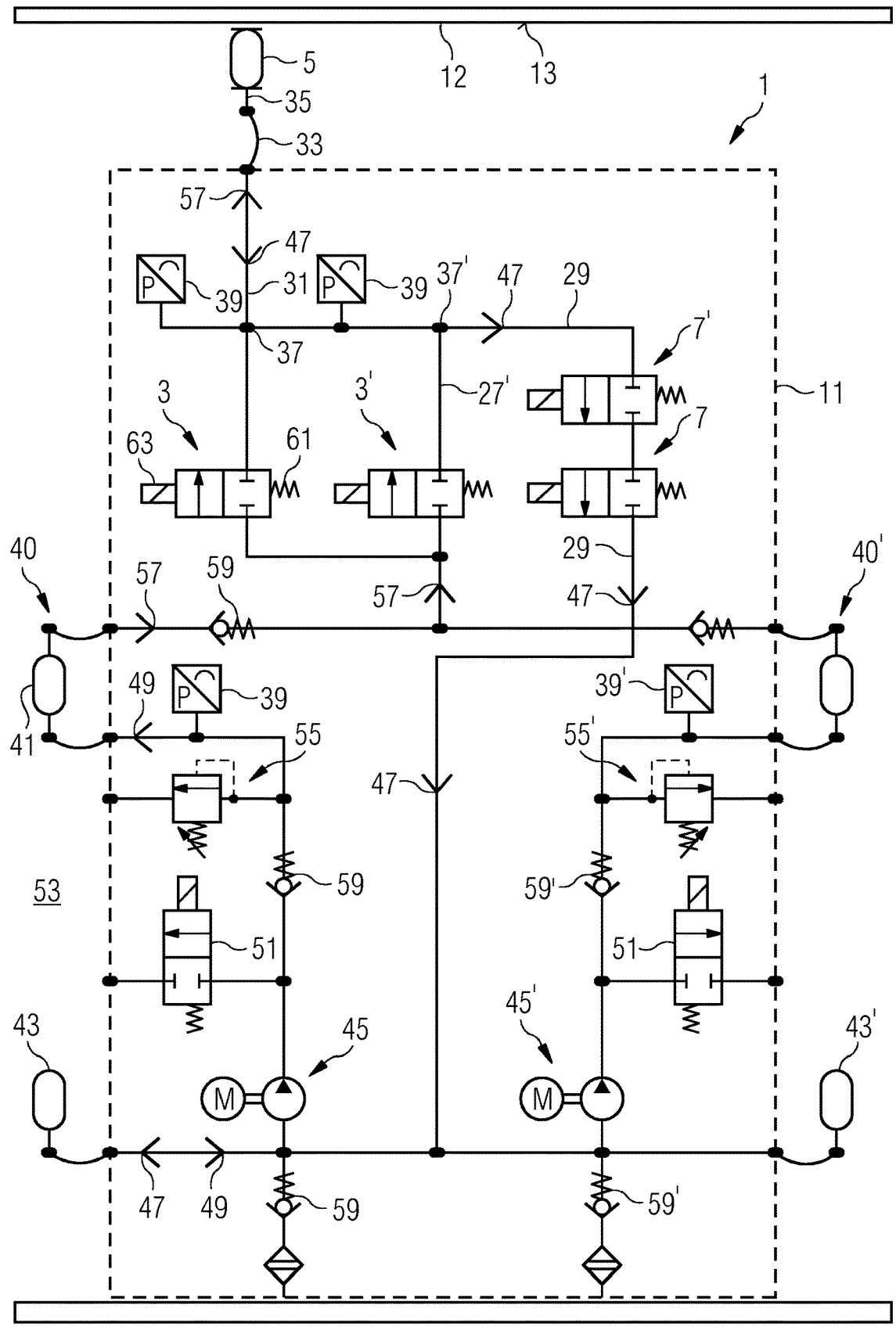

| | | |
|---|---|---|
| 8,851,840 B2 | 10/2014 | Hancock et al. |
| 11,274,649 B2 * | 3/2022 | Akay .................... F03D 1/0633 |
| 2012/0141271 A1 * | 6/2012 | Southwick ............ F03D 7/0232 |
| | | 416/1 |
| 2018/0163698 A1 | 6/2018 | Miranda et al. |

FOREIGN PATENT DOCUMENTS

| | | |
|---|---|---|
| WO | 2010/023278 A1 | 3/2010 |
| WO | 2011/026495 A2 | 3/2011 |
| WO | 2012/028148 A1 | 3/2012 |
| WO | 2018/041420 A1 | 3/2018 |
| WO | 2018/162102 A1 | 9/2018 |

OTHER PUBLICATIONS

International Search Report and Written Opinion for PCT/EP2019/080092 dated Feb. 14, 2020.

* cited by examiner

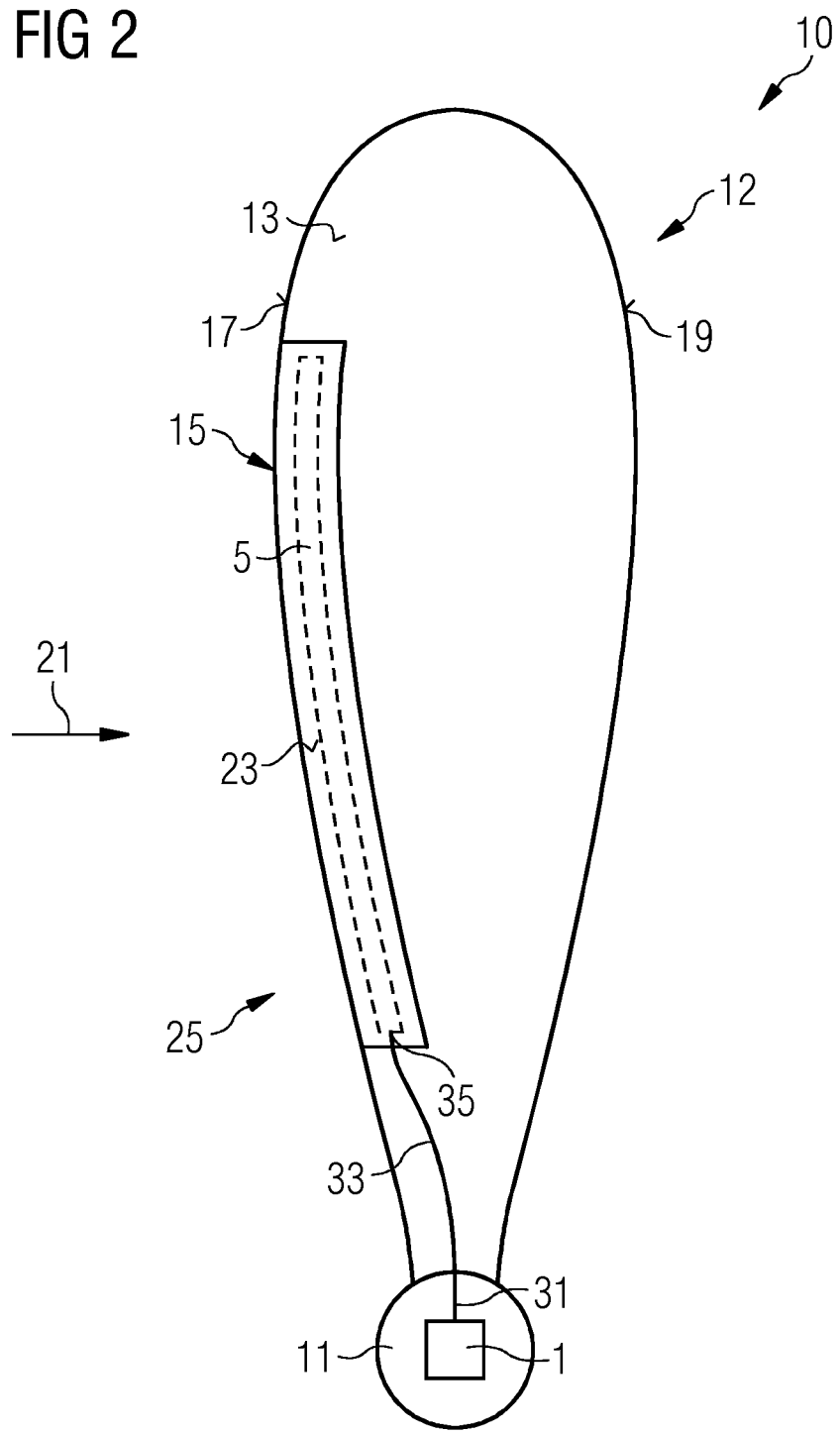

SAFE STATE OF AN ADAPTABLE WIND TURBINE BLADE

CROSS-REFERENCE TO RELATED APPLICATIONS

This application claims priority to PCT Application No. PCT/EP2019/080092, having a filing date of Nov. 4, 2019, which is based on EP Application No. 18212377.8, having a filing date of Dec. 13, 2018, the entire contents both of which are hereby incorporated by reference.

FIELD OF TECHNOLOGY

The following relates to an arrangement and to a method for controlling inflow and outflow of a fluid into and out of an expandable container arranged to change a state of an adaptable flow regulating device installed at a wind turbine rotor blade. Furthermore, the following relates to a flow regulating system for regulating air flow of a wind turbine rotor blade and relates further to an adaptable wind turbine rotor blade.

BACKGROUND

A wind turbine rotor blade may have installed an adaptable flow regulating device on its surface, such as a spoiler or flap. The spoiler may be adjusted in different states of the spoiler. The state of the spoiler may relate to a protrusion height and/or tilt angle by which the spoiler extends from or is angularly tilted relative to other surface portions of the rotor blade. In general, a flow regulating device may be considered to comprise a device which is capable of, in certain conditions, enhancing the lift coefficient of the airfoil section, for example by increasing the level of energy of the boundary layer of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine wing comprising a pneumatically actuated spoiler movable perpendicular to an airstream.

WO 2018/041420 disclose a rotor blade comprising an aerodynamic device for influencing the air flow flowing from the leading-edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

When a wind turbine rotor blade is equipped with an adaptable flow regulating device, such as a spoiler or a flap, in case of power failure at the flow regulating device, the risk of damage of components of the wind turbine may evolve.

Thus, there may be a need for an arrangement and for a method for controlling inflow and outflow of a fluid into and out of an expandable container arranged to change a state of an adaptable flow regulating device installed at a wind turbine rotor blade, wherein a safe state of the flow regulating device may be ensured in case of an emergency or in particular in case of a power failure.

In particular, when introducing one or more devices at a wind turbine rotor blade which may affect the air flow at or close to the rotor blade involving stall of air flow, there may be a need of defining a safe state of the adaptable rotor blade. Otherwise, the worst-case state would need to be taken into account, for example full deactivation in case of an overspeed or in case of a grid drop. Conventionally, active add-on on a rotor blade, such as a spoiler or a flap, may not have been taken into account in relation to defining a safe state of the wind turbine.

SUMMARY

An aspect relates to an arrangement for controlling inflow and outflow of a fluid into and out of an expandable container arranged to change a state of an adaptable flow regulating device installed at a wind turbine rotor blade, the arrangement comprising: an inflow valve arranged to control fluid inflow into the container; an outflow valve arranged to control fluid flow out of the container; wherein the inflow valve and the outflow valve are configured to prohibit fluid flow into and/or out of the container in case of a safety stop event, in particular including failure of electric power supply to the inflow valve and/or the outflow valve.

The failsafe state may be used as a safety critical function. The safe state (or safety stop event) may be triggered e.g., in case of a critical operational situation, e.g., rotor overspeed and/or a controller runaway-situation, where one cannot trust the standard controller, in particular in order to stop operation of the wind turbine, including stopping the rotor.

The arrangement may for example be implemented partly in software and/or hardware. The fluid may in particular comprise air, in particular compressed air.

The expandable container may be configured as a hose or a bag, for example substantially having a cylindrical shape. The cross-sectional area of the expandable container may change upon inflating or deflating the container. The expandable container may be in contact with a back surface or at least a portion of the adaptable flow regulating device in order to change position and/or orientation and/or tilt of an airfoil shaped surface of the adaptable flow regulating device which is exposed to the air flow. By inflating/deflating the expandable container, the flow regulating device may be adapted, i.e., adjusted or changed regarding its air flow influencing action.

The adaptable flow regulating device may be adapted to deflect the air flow to a different degree depending on the state of the flow regulating device. The state of the flow regulating device is thus adjustable using the expandable container by inflating/deflating it to a different degree.

The inflow valve as well as the outflow valve may comprise a lumen through which the fluid can flow. The inflow valve and the outflow valve may be arranged to close the lumen or such as to prohibit fluid flow through the lumen. Closing the lumen and thereby prohibiting the fluid flow through the respective valves, i.e., the inflow valve and the outflow valve, may automatically be adopted in case of a failure of electric power supply to the respective valve. Thereby, in case of an emergency, in particular failure of electric power supply, the expandable container may be maintained in its current state which is related to a degree of filling or a pressure or a size of the expandable container. Thereby, it may for example be ensured that the adaptable flow regulating device may be maintained in its current state. The current state of the flow regulating device may be associated with in particular air flow influencing property, for example driving impact or torque acting on the wind turbine rotor. Thereby, by maintaining the state of the flow regulating device in case of an emergency, in particular failure of a power supply, the effect of the flow regulating device is predictable and defined. Thereby, it may be easier to perform further procedures for putting the wind turbine into a safe state.

Thereby, embodiments of the present invention introduce a safe state of an adaptable flow regulating device in case of a power-off.

The adaptable flow regulating device may for example comprise a spoiler which is for example installed at a front edge or leading edge, in particular at a suction side, of the rotor blade. The adaptable flow regulating device may also additionally or alternatively comprise a flap which may be installed at a trailing edge, in particular at a suction side of the rotor blade.

The arrangement may be adapted for controlling more than one adaptable flow regulating device. In particular, the flow regulating device may comprise several portions which are installed along a longitudinal axis of the rotor blade and which may be independently controlled by the arrangement.

The inflow valve as well as the outflow valve may be directly or indirectly connected to (an outlet/inlet or in general opening) of the expandable container. For example, one or more pipes may be between the opening of the container and the respective valve.

The inflow valve and/or the outflow valve may each close (thereby prohibiting fluid flow through them) in case of power failure. The failure of electric power supply may be present if for example the voltage of the electric power supply drops by for example 10% to 100% or when in general the electric power supply does not comply with the rating of the respective valve.

During a normal operation the inflow valve and/or the outflow valve may be supplied with electric energy from a local power supply of the wind turbine or from a utility grid the wind turbine is connected to. The failure of the electric power supply may for example be due to a short circuit, due to a utility grid fault or in general to any fault of the wind turbine.

According to an embodiment of the present invention, the arrangement further comprises an inflow pipe connectable to the expandable container; and an outflow pipe connectable to the expandable container, wherein the inflow valve is arranged to control fluid inflow via the inflow pipe into the expandable container, wherein the outflow valve is arranged to control fluid flow via the outflow pipe out of the expandable container.

The inflow pipe as well as the outflow pipe may be connectable or connected to the expandable container either directly or via one or more further pipes. The inflow valve may be arranged within or connected to the inflow pipe and the outflow valve may be arranged within or connected to the outflow pipe. There may be one or more inflow pipes as well as one or more outflow pipes which may each be equipped with a corresponding valve. Providing an inflow pipe and an outflow pipe may allow separate paths for inflating the container and for deflating the container. During inflating the container, the fluid may flow through at least the inflow pipe and the inflow valve into a lumen of the container. During deflating the container, the fluid may flow from the lumen of the container at least through the outflow pipe and the outflow valve. Thereby controlled inflation and deflation of the container is achievable or may be achievable.

According to an embodiment of the present invention, the arrangement further comprises an inflow-outflow pipe portion connectable to an inflow-outflow port of the container allowing inflow and outflow of fluid; and a pipe connector at one end connected to the inflow-outflow pipe portion, wherein the inflow pipe and the outflow pipe are joined at another end of the pipe connector.

The container may have a single opening which may be connected to the inflow-outflow pipe portion. The container may thereby contain only a single inflow-outflow port, thereby simplifying the container. At the pipe connector lumens of the inflow-outflow pipe portion and lumens of the inflow pipe and the outflow pipe may be in fluid communication with each other. The connector may be configured as a T-connector for example, thereby being configured to join three pipe ends with each other. Thereby, during inflow as well as during outflow of the fluid into or from the container, the inflow-outflow pipe portion may synergistically be used. Thereby, the arrangement may be simplified.

According to an embodiment of the present invention, the inflow valve and/or the outflow valve comprises a spring element and an electro magnet, wherein the spring element sets the respective valve into a closed state prohibiting fluid flow, unless the electro magnet is actuated by electric power.

The spring element as well as the electromagnet may be in contact with or may change a position of a barrier element, which may be movably arranged within the lumen of the respective valve. Upon shifting or moving the barrier element, the lumen of the respective valve may be closed or opened or set in an intermediate state between fully opened and fully closed. The electromagnet may be actuated by providing a voltage or in general electric energy. The spring element may not require any electric energy for functioning but may comprise an elastic spring element which applies a force to the barrier element in a direction in order to shift or move the barrier element in a position which prohibits fluid flow through the lumen of the respective valve. Thereby, a safe system may be provided.

According to an embodiment of the present invention, the arrangement further comprises at least one further inlet valve arranged in series with the inlet valve; and/or at least one further outlet valve arranged in series with the outlet valve.

When one or more further inlet valve(s) are arranged in series with the inlet valve, a redundancy may be provided ensuring reliable operation in case of a power-off, since when one of the inlet valves fails, the one or more other inlet valves arranged in serial may still function, thereby ensuring prohibiting fluid flow in case of a power failure.

According to an embodiment of the present invention, the arrangement further comprises at least one still further inlet valve arranged in parallel to the inlet valve; and/or at least one still further outlet valve arranged in parallel to the outlet valve.

When one or more inlet device or outlet device are arranged in parallel, the filling or emptying of the container may be ensured, since redundancy for filling or emptying the container may be provided.

According to an embodiment of the present invention, the arrangement further comprises at least one pressure sensor, in particular arranged between the expandable container and the inflow valve and/or the outflow valve, further in particular arranged to measure fluid pressure at the pipe connector.

The pressure sensor may allow appropriate controlling of the valves. In particular, the state of the adaptable flow regulating device may be related or may even be defined by a pressure within the expandable container. Thus, by taking into account measurement values of the pressure sensor, the state of the adaptable or expandable container and thereby the state of the flow regulating device may be inferred. Furthermore, one or more leaks in one or more pipes may be detected.

According to an embodiment of the present invention, the arrangement further comprises a fluid supply system adapted: to generate pressurized fluid, to supply the pressurized fluid to the inlet valve, to receive fluid via the outlet valve from the container.

The fluid supply system may be adapted to provide pressurized fluid for inflating the expandable container and may also receive fluid exhausted from the container in case of deflating the container.

According to an embodiment of the present invention, the arrangement further comprises a first fluid control volume (e.g. first fluid reservoir) (e.g. for high pressure fluid); a second fluid control volume (e.g. second fluid reservoir (e.g. for low pressure fluid); e.g. a pipe system; a fluid pump arranged between the first control volume and the second control volume, wherein the fluid received via the outlet valve from the container is lead to the second control volume, wherein the fluid pump is arranged to pump fluid from the second control volume to the first control volume, thereby increasing the pressure of the fluid.

The first and second reservoirs are optional features, thus may not be included in the arrangement according to an embodiment.

Advantageously, when the expandable container is deflated, the exhausted fluid can be recycled by storing it within the second fluid reservoir. The pump advantageously may pressurize or pump the fluid from the second reservoir to the first reservoir, which may later then be used for inflating the expandable container. The fluid supply system may partly or entirely be located in a hub of a wind turbine to which plural rotor blades are mounted.

According to an embodiment of the present invention, the arrangement further comprises at least one further fluid supply system configured similar or same as the fluid supply system and connected in parallel to the fluid supply system.

The further fluid supply system may serve as a redundant fluid supply system in case the (first) fluid supply system fails.

According to an embodiment of the present invention, it is provided a flow regulating system for regulating air flow at a wind turbine rotor blade, comprising: an adaptable flow regulating device, in particular spoiler or flap, having an airfoil shaped surface exposed to an air stream and being installable at the wind turbine rotor blade; an expandable container, arranged to change position and/or orientation and/or tilt of the airfoil shaped surface; and an arrangement according to one of the preceding embodiments connected to the expandable container.

Thereby, a safe state of the flow regulating system may be defined and achieved in case of a fault, in particular a power fault.

The expandable container may be arranged within the rotor blade. For example, the inflow-outflow pipe portion may at one end be connected to the inflow pipe and the outflow pipe via the pipe connector, which may be located within the hub. At another end, the inflow-outflow pipe portion may be connected to the inflow-outflow port of the container which is located within the rotor blade or at the rotor blade, such as to change the state of the flow regulating device.

According to an embodiment of the present invention, it is provided an adaptable wind turbine rotor blade, comprising: a rotor blade; and a flow regulating system according to the preceding embodiments.

It should be understood that features, individually or in any combination, described, disclosed, explained or provided for an arrangement for controlling inflow and outflow of a fluid into and out of an expandable container arranged to change a state of an adaptable flow regulating device and stored at a wind turbine rotor blade may also, individually or in any combination, apply to a respective method referred to below.

According to an embodiment of the present invention, it is provided a method of controlling inflow and outflow of a fluid into and out of an expandable container arranged to change a state of an adaptable flow regulating device installed at a wind turbine rotor blade, the method comprising: controlling fluid inflow into the container by an inflow valve; controlling fluid flow out of the container by an outflow valve; prohibiting fluid flow into and/or out of the container in case of failure of electric power supply to the inflow valve and/or the outflow valve.

The invention is not restricted to the described or illustrated embodiments. The aspects defined above and further aspects of embodiments of the present invention are apparent from the examples of embodiments to be described hereinafter and are explained with reference to the examples of embodiments. The following will be described in more detail hereinafter with reference to examples of embodiments but to which the invention is not limited.

BRIEF DESCRIPTION

Some of the embodiments will be described in detail, with reference to the following figures, wherein like designations denote like members, wherein:

FIG. 1 schematically illustrates an arrangement for controlling inflow and outflow of a fluid into and out of an expandable container arranged to change a state of an adaptable flow regulating device installed at a wind turbine rotor blade according to an embodiment of the present invention which is adapted to carry out a method according to an embodiment of the present invention; and FIG. 2 schematically illustrates an adaptable wind turbine rotor blade according to an embodiment of the present invention, which comprises a flow regulating system according to an embodiment of the present invention.

DETAILED DESCRIPTION

FIG. 1 schematically illustrates an arrangement 1 for controlling inflow and outflow of a fluid into and out of an expandable container 5 arranged to change a state of an adaptable flow regulating device installed at a wind turbine rotor blade according to an embodiment of the present invention. Thereby, the arrangement 1 comprises an inflow valve 3 which is arranged to control fluid inflow into the expandable container 5. Furthermore, the arrangement 1 comprises an outflow valve 7 which is arranged to control fluid flow out of the expandable container 5.

The inflow valve 3 and the outflow valve 7 are configured to prohibit fluid flow into and/or out of the container 5 in case of failure of electric power supply to the inflow valve 3 and/or the outflow valve 7.

The arrangement 1 is comprised in an adaptable wind turbine rotor blade 10, which is schematically illustrated in FIG. 2, wherein the arrangement 1 is actually arranged within a hub 11 to which the adaptable wind turbine rotor blade 10 is connected.

The adaptable wind turbine rotor blade 10 comprises a bare rotor blade 12 having a rotor blade surface 13 at which an adaptable flow regulating device 15 is mounted. In particular, the rotor blade 10 comprises a front edge 17 and a trailing edge 19 with respect to a flow direction of an air flow 21. The rotor blade 10 has installed at the surface 13 or in general at the rotor blade 10, an adaptable flow regulating device 15. In the illustrated embodiment, the flow regulating device 15 comprises or is a spoiler which is mounted at or close to the front edge 17, in particular at a suction surface 13 of the rotor blade 10.

The adaptable flow regulating device 15 can be set in a different state by inflating or deflating the expandable container 5 which is installed below an airfoil shaped surface 23 of the flow regulating device 15. Upon inflating or deflating the expandable container 5, the airfoil shaped surface 23 of the flow regulating device 15 changes tilt and/or position and/or orientation in order to deflect the air to different degree. Thereby, the aerodynamic property of the rotor blade 10 is changeable or adaptable.

The bare rotor blade is labeled with reference sign 12. A flow regulating system 25 comprised in the adaptable rotor blade 10, comprises the adaptable flow regulating device 15, the expandable container 5 as well as the arrangement 1 for controlling inflow and outflow of a fluid into and out of the expandable container 5.

With reference to FIG. 1, the arrangement 1 which may be installed within the hub 11, comprises in the illustrated embodiment an inflow pipe 27, which is connectable to the container 5. Furthermore, the arrangement 1 comprises an outflow pipe 29 which is connectable to the expandable container 5.

In particular, the inflow valve 3 is arranged to control fluid inflow via the inflow pipe 27 into the expandable container 5 and the outflow valve 7 is arranged to control fluid flow via the outflow pipe 29 out of the expandable container 5. In the illustrated embodiment, the arrangement 1 further comprises an inflow-outflow pipe portion 31, 33 from which the section 33 is connected to an inflow-outflow port 35 of the container 5 allowing inflow and outflow of fluid. Another section 31 of the inflow-outflow pipe portion is connected at one end to a pipe connector 37, wherein the inflow pipe 27 and the outflow pipe 29 are joined at another end at the pipe connector 37.

In particular, in the illustrated embodiment, a further inlet valve 3' is connected in parallel to the inlet valve 3, namely in a further inlet pipe 27'. The outlet pipe 29 is in the illustrated embodiment connected or joined at another pipe connector 37' to which also the further inlet pipe 27' is connected.

In the illustrated embodiment, the arrangement 1 further comprises a still further outlet valve 7' which is connected in series with the outlet valve 7, namely arranged within the outlet pipe 29. The series connected still further outlet valve 7' may provide redundancy, and thus safety in case the outlet valve 7 is faulty.

The arrangement 1 comprises at least one pressure sensor 39, in particular several pressure sensors 39 which may be installed at different positions of the pipe system.

The illustrated embodiment of the arrangement 1 further comprises a fluid supply system 40 which is adapted to generate pressurized fluid, to supply the pressurized fluid to the inlet valve 3, 3' and to receive fluid via the outlet valve 7, 7' from the container 5. In particular, the fluid supply system 40 comprises a first fluid reservoir 41 for storing high-pressure fluid, comprises a second fluid reservoir 43 for storing low-pressure fluid and comprises a pump 45, which is arranged between the first reservoir 41 and the second reservoir 43.

The fluid 47 received via the outlet valve 7, 7' from the container 5 is led to the second reservoir 43. The fluid pump 45 is arranged to pump fluid 49 from the second reservoir 43 to the first reservoir 41, thereby increasing the pressure of the fluid.

In the illustrated embodiment, the arrangement 1 further comprises a further fluid supply system 40' which may be configured similar or identical to the fluid supply system 40 and which is therefore not described in detail.

The fluid supply system 40 comprises a valve 51 allowing for example venting the exhausted fluid 49 to the environment 53. The supply system 40 comprises an over pressure valve 55. For inflating the expandable container, pressurized fluid 57 from the first reservoir 41 may be guided via a valve 59 and via the at least one inlet valve 3, 3' via the inlet pipe 27, 27' and via the inflow-outflow pipe portions 31, 33 to the fluid port 35 of the container and into the container 5.

The inflow valves 3, 3' and the outflow valves 7, 7' each comprise a spring element 61 and an electromagnet 63, wherein the spring element 61 sets the respective valve into a closed state prohibiting fluid flow, unless the electromagnet 63 is actuated by electric power.

In the embodiment illustrated in FIG. 1, the situation during a power failure is illustrated, wherein all valves 3, 3', 7, 7' are in the closed state prohibiting fluid flow. According to embodiments of the present invention, valves are provided which are blocking for air flow when they are powered-off In this case, the adaptable flow regulating device 15 will remain in its current position (activation position or state) during an emergency shutdown, or a power-down event.

Embodiments of the present invention introduce a defined safe state for an adaptable flow regulating device. The valves, in particular inflow valves 3, 3', and outflow valves 7, 7', may put the system into a safe state, when they are powered-off. Different kinds of redundancies of valves and pipes may be provided, for example parallel connection or series connection of several valves. According to an embodiment of the present invention, a safe pitch and a safe state of the adaptable flow regulating device may be combined for achieving a safe stop function of a wind turbine. As an advantage, the defined or predictable loads in case of emergency stop or power-down may be reduced, as a worst case activation they don't need to be taken into account.

Thereby, embodiments of the present invention may achieve that the actuator system (for an adaptable flow regulating device) may switch into a specific state when emergency stop is actuated or it may keep the state it currently has.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An arrangement for controlling inflow and outflow of a fluid into and out of an expandable container arranged to change a state of an adaptable flow regulating device installed at a wind turbine rotor blade, the arrangement comprising:
   an inflow valve arranged to control fluid inflow into the container;
   an outflow valve arranged to control fluid outflow out of the container;
   wherein the inflow valve and the outflow valve are configured to prohibit fluid flow into and out of the container in case of a safety stop event such that the adaptable flow regulating device is maintained at a respective state.

2. The arrangement according to claim 1, further comprising:
   an inflow pipe connectable to the expandable container; and
   an outflow pipe connectable to the expandable container,
   wherein the inflow valve is arranged to control fluid inflow via the inflow pipe into the expandable container,
   wherein the outflow valve is arranged to control fluid outflow via the outflow pipe out of the expandable container.

3. The arrangement according to claim 2, further comprising:
   an inflow-outflow pipe portion connectable to an inflow-outflow port of the container allowing inflow and outflow of fluid; and
   a pipe connector at one end connected to the inflow-outflow pipe portion, wherein the inflow pipe and the outflow pipe are joined at another end of the pipe connector.

4. The arrangement according to claim 1, wherein the inflow valve and/or the outflow valve comprises a spring element and an electro magnet, wherein the spring element sets the respective valve into a closed state prohibiting fluid flow, unless the electro magnet is actuated by electric power.

5. The arrangement according to claim 1, further comprising:
   at least one further inlet valve arranged in series with the inlet valve; and/or
   at least one further outlet valve arranged in series with the outlet valve.

6. The arrangement according to claim 1, further comprising:
   at least one still further inlet valve arranged in parallel to the inlet valve; and/or
   at least one still further outlet valve arranged in parallel to the outlet valve.

7. The arrangement according to claim 1, further comprising:
   at least one pressure sensor.

8. The arrangement according to claim 7,
   wherein the at least one pressure sensor is arranged between the expandable container and the inflow valve and/or the outflow valve.

9. The arrangement according to claim 7, wherein the at least one pressure sensor is arranged to measure fluid pressure at a pipe connector.

10. The arrangement according to claim 1, further comprising:
    a fluid supply system adapted:
       to generate pressurized fluid,
       to supply the pressurized fluid to the inlet valve,
       to receive fluid via the outlet valve from the container.

11. The arrangement according to claim 10, wherein the fluid supply system comprises:
    a first fluid control volume;
    a second fluid control volume;
    a fluid pump arranged between the first control volume and the second control volume,
    wherein the fluid received via the outlet valve from the container is led to the second control volume,
    wherein the fluid pump is arranged to pump fluid from the second control volume to the first control volume, thereby increasing the pressure of the fluid.

12. The arrangement according to claim 10, further comprising:
    at least one further fluid supply system configured as the fluid supply system and connected in parallel to the fluid supply system.

13. The arrangement according to claim 1, wherein the arrangement is at least partially arranged within a hub of a wind turbine.

14. A flow regulating system for regulating air flow at a wind turbine rotor blade, comprising:
    an adaptable flow regulating device, having an airfoil shaped surface exposed to an air stream and being installable at the wind turbine rotor blade;
    an expandable container, arranged to change position and/or orientation and/or tilt of the airfoil shaped surface; and
    an arrangement according to claim 1 connected to the expandable container.

15. The flow regulating system according to claim 14, wherein the expandable container is arranged within the rotor blade.

16. An adaptable wind turbine rotor blade, comprising:
    a rotor blade; and
    a flow regulating system according to claim 15.

17. A method of controlling inflow and outflow of a fluid into and out of an expandable container arranged to change a state of an adaptable flow regulating device installed at a wind turbine rotor blade, the method comprising:
    controlling fluid inflow into the container by an inflow valve;
    controlling fluid outflow out of the container by an outflow valve;
    prohibiting fluid flow into and out of the container in case of a safety stop event such that the adaptable flow regulating device is maintained at a respective state.

18. The flow regulating system for regulating air flow at a wind turbine rotor blade of claim 14, wherein the adaptable flow regulating device is a spoiler or flap.

* * * * *